United States Patent
Ota et al.

(10) Patent No.: US 7,462,130 B2
(45) Date of Patent: Dec. 9, 2008

(54) CONTROL APPARATUS AND CONTROL METHOD OF AN AUTOMATIC TRANSMISSION

(75) Inventors: Hirofumi Ota, Toyota (JP); Akiharu Abe, Toyota (JP); Atsushi Honda, Seto (JP); Kazutoshi Nozaki, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 341 days.

(21) Appl. No.: 11/473,158

(22) Filed: Jun. 23, 2006

(65) Prior Publication Data
US 2007/0015624 A1 Jan. 18, 2007

(30) Foreign Application Priority Data
Jul. 13, 2005 (JP) .............................. 2005-203850

(51) Int. Cl.
*F16H 61/16* (2006.01)
*F16H 61/18* (2006.01)
(52) U.S. Cl. .................... 477/125; 477/135; 477/144
(58) Field of Classification Search .................... 477/34, 477/125, 132, 135, 144, 906
See application file for complete search history.

(56) References Cited

U.S. PATENT DOCUMENTS

| | | | |
|---|---|---|---|
| 5,493,928 A | 2/1996 | Mitchell et al. | |
| 5,921,885 A * | 7/1999 | Tabata et al. | 477/107 |
| 7,181,327 B2 * | 2/2007 | Lee | 701/51 |
| 7,217,222 B2 * | 5/2007 | Centlivre et al. | 477/98 |
| 2004/0235601 A1 | 11/2004 | Inuta | |

FOREIGN PATENT DOCUMENTS

| | | |
|---|---|---|
| DE | 195 38 495 A1 | 4/1996 |
| DE | 10 237245 | 2/2004 |
| JP | 09317873 A * | 12/1997 |
| JP | 2000-65203 | 3/2000 |
| JP | 2005282600 A * | 10/2005 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

A control apparatus and control method of an automatic transmission that establishes a plurality of speeds of different speed ratios by selectively engaging and/or releasing a plurality of engagement devices, detects abnormal engagement of at least one of the engagement devices which causes tie-up to occur in the automatic transmission; establishes a predetermined specific speed set in advance in order to prevent tie-up from occurring in the automatic transmission, when abnormal engagement of the at least one of the engagement devices is detected; and places the automatic transmission in a neutral state when an engine speed will exceed a predetermined allowable speed if the predetermined specific speed is established.

9 Claims, 9 Drawing Sheets

FIG. 2

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  |  | O |  |

O : ENGAGED (O) : ENGAGED DURING ENGINE BRAKING

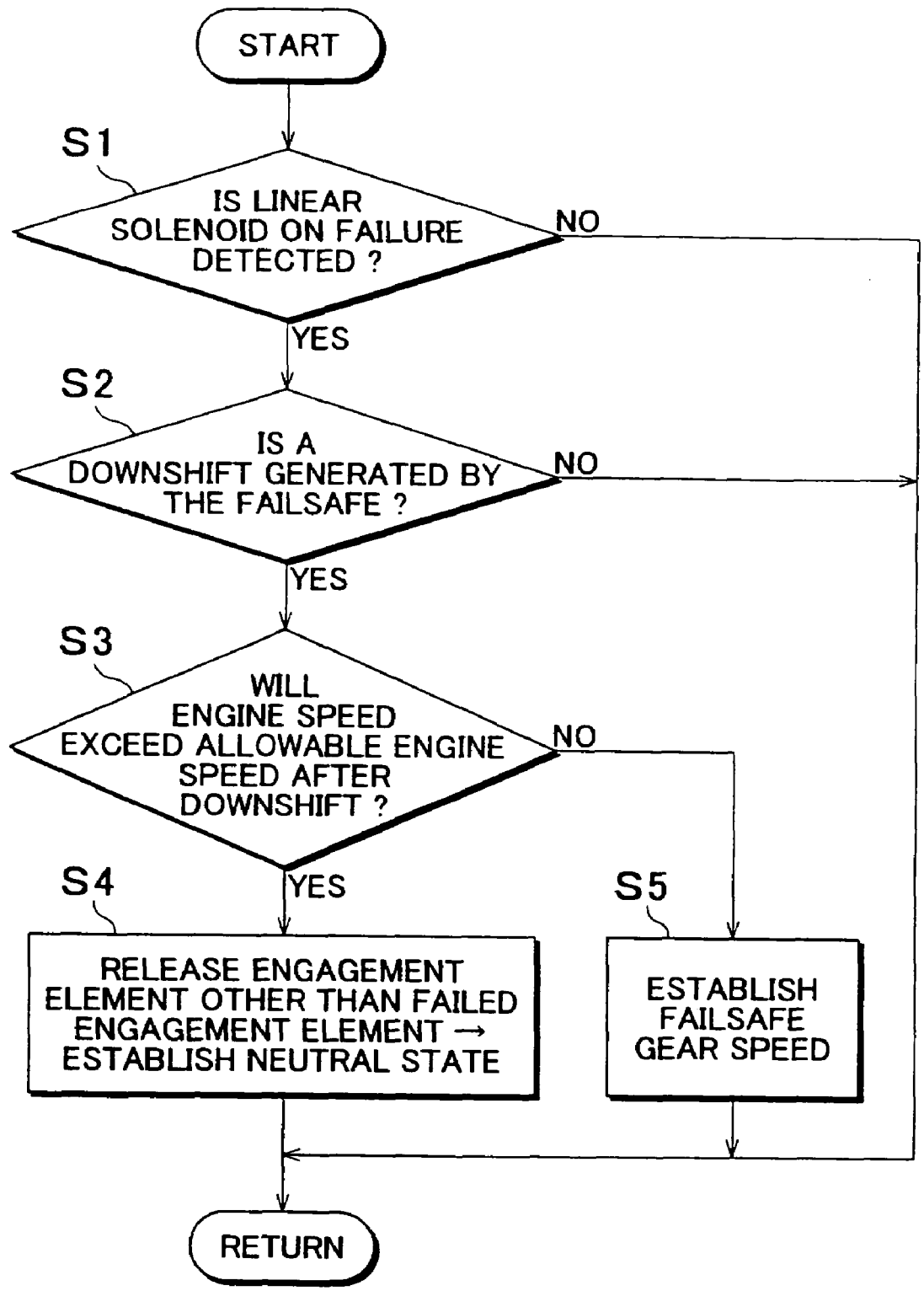

CONTROL APPARATUS AND CONTROL METHOD OF AN AUTOMATIC TRANSMISSION

INCORPORATION BY REFERENCE

The disclosure of Japanese Patent Application No. 2005-203850 filed on Jul. 13, 2005, including the specification, drawings and abstract is incorporated herein by reference in its entirety.

BACKGROUND OF THE INVENTION

1. Field of the Invention

The invention relates to a control apparatus and control method of a vehicular automatic transmission. More particularly, the invention relates to control of an automatic transmission when tie-up occurs in the automatic transmission.

2. Description of the Related Art

Vehicles provided with an automatic transmission in which a shift is executed by selectively engaging a plurality of engagement devices are well known. For example, the vehicle is described in Japanese Patent Application Publication No. JP-A-2000-65203 is one such vehicle. Japanese Patent Application Publication No. JP-A-2000-65203 discloses a control apparatus of an automatic transmission which prevents tie-up (i.e., double lock-up) from occurring in an automatic transmission. More specifically, if an engagement device is unable to release due to a problem with, for example, a shift control valve that controls the engagement operation of the engagement device, it may cause tie-up to occur in the automatic transmission 10. When this kind of tie-up cause is detected, i.e., when abnormal engagement of an engagement device is detected, the control apparatus prevents that tie-up from occurring by unconditionally establishing a specific speed set in advance that includes, as a necessary condition in order for that specific speed to be established, the engagement of the engagement device that would cause the tie-up to occur.

The shift into the specific speed to be established which includes, as a necessary condition in order for it to be established, the engagement of the engagement device may be a downshift. Typically when a downshift is executed in an automatic transmission when a vehicle is running, the engine speed increases in response to the change in speed ratio of the automatic transmission before and after that downshift in which there is almost no change in the vehicle speed.

As a result, depending on the running state of the vehicle, i.e., depending on the vehicle speed, for example, there is a possibility that the engine speed may exceed the maximum speed allowed for the engine if a downshift is performed into the specific speed to be established that includes, as a necessary condition for that specific speed to be established, the engagement of the engagement device that will cause tie-up to occur.

SUMMARY OF THE INVENTION

In view of the foregoing problems, this invention thus provides a control apparatus and control method of an automatic transmission that establishes a plurality of speeds of different speed ratios by selectively engaging and/or releasing a plurality of engagement devices, and which prevents the engine speed from exceeding a predetermined maximum allowable speed when preventing tie-up in the automatic transmission which arises from abnormal engagement of an engagement device.

Therefore, one aspect of the invention relates to a control apparatus of an automatic transmission that establishes a plurality of speeds of different speed ratios by selectively engaging and/or releasing a plurality of engagement devices. This control apparatus includes an abnormal engagement detector that detects abnormal engagement of at least one of the engagement devices which causes tie-up to occur in the automatic transmission; and a controller that establishes a predetermined specific speed set in advance in order to prevent tie-up from occurring in the automatic transmission, when abnormal engagement of the at least one of the engagement devices is detected by the abnormal engagement detector, and places the automatic transmission in a neutral state when an engine speed will exceed a predetermined allowable speed if the predetermined specific speed is established.

Also, another aspect of the invention relates to a control method of an automatic transmission that establishes a plurality of speeds of different speed ratios by selectively engaging and/or releasing a plurality of engagement devices. This control method includes the steps of: detecting abnormal engagement of at least one of the engagement devices which causes tie-up to occur in the automatic transmission; establishing a predetermined specific speed set in advance in order to prevent tie-up from occurring in the automatic transmission, when abnormal engagement of the at least one of the engagement devices is detected; and placing the automatic transmission in a neutral state when an engine speed will exceed a predetermined allowable speed if the predetermined specific speed is established.

According to the control apparatus and control method of an automatic transmission described above, in an automatic transmission which establishes a plurality of speeds of different speed ratios by selectively engaging and/or releasing a plurality of engagement devices, when abnormal engagement of at least one of the engagement devices which causes tie-up to occur in the automatic transmission is detected and the engine speed will exceed the predetermined allowable speed if the predetermined specific speed set in advance is established in order to prevent that tie-up from occurring, the automatic transmission is placed in a neutral state. As a result, tie-up that arises from abnormal engagement of an engagement device is prevented from occurring in the automatic transmission. In addition, a case in which the engine speed exceeds the predetermined allowable engine speed due to the predetermined specific speed being established, i.e., in which overrun that accompanies the shift into the predetermined specific speed occurs, can be avoided.

In this case, the automatic transmission preferably includes a planetary gear type multiple-speed transmission in which the gear speed is changed by selectively connecting rotating elements of a plurality of sets of planetary gearsets using hydraulic type friction engagement devices. The automatic transmission may be either transverse mounted in the vehicle, as it is in an FF (front engine, front drive) vehicle, in which the axis of the transmission lies in the lateral direction of the vehicle, or longitudinal mounted in the vehicle, as it is in an FR (front engine, rear drive) vehicle, in which the axis of the transmission lies in the longitudinal direction of the vehicle. Also, the automatic transmission can be any type of transmission as long as a plurality of gear speeds is able to be alternatively established. For example, various kinds of multiple-speed automatic transmissions can be used such as automatic transmissions with 4, 5, 6, 7, or 8 forward speeds, for example.

Also, a multiple disc or single disc type clutch or brake, or a belt-type brake, which engages by means of a hydraulic actuator is preferably widely used as the hydraulic type friction engagement device. An oil pump which supplies hydraulic fluid to engage the hydraulic type friction engagement device may be driven to deliver hydraulic fluid using either a power source for running the vehicle or a dedicated electric motor or the like provided separate from the power source for running the vehicle.

Also, in view of responsiveness, a hydraulic pressure control circuit that includes the hydraulic type friction engagement device preferably directly supplies output hydraulic pressure from linear solenoid valves, for example, to each hydraulic actuator (hydraulic cylinder) of the hydraulic type friction engagement device. However, the structure may also be such that a shift control valve is controlled by that output hydraulic pressure and hydraulic fluid is supplied to the hydraulic actuator from that control valve.

Also, one of the plurality of linear solenoid valves is preferably provided for each one of the plurality of hydraulic type friction engagement devices, for example. Various other modes are also possible, however. For example, when there are a plurality of hydraulic type friction engagement devices which do not engage simultaneously and are not controlled to engage and release simultaneously, a common linear solenoid valve may be provided for those hydraulic type friction engagement devices. Also, it is not absolutely necessary that all of the hydraulic pressure control for the hydraulic type friction engagement devices be performed using linear solenoid valves. That is, some or all of the hydraulic pressure control may alternatively be performed by regulating means other than a linear solenoid valve, such as by duty control of an ON-OFF solenoid valve.

Also, the power source for running the vehicle is preferably drivingly connected to an input rotating member of the automatic transmission via a fluid power transmitting device or a lockup clutch or the like. A torque converter with a lockup clutch or a fluid coupling may be used as the fluid power transmitting device. Further, an engine which is an internal combustion engine such as a gasoline engine or a diesel engine may be used as the power source for running the vehicle. Moreover, an electric motor or the like may also be used, in addition to the engine, in a power transmission path between the engine and the driven wheels as a power source to assist with running.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 2 is a clutch and brake engagement chart showing various engagement and release combinations of hydraulic type friction engagement devices to achieve a plurality of speeds in the vehicular automatic transmission shown in FIG. 1;

FIG. 9 is a flowchart illustrating the main portion of a control operation by the electronic control unit shown in FIG. 4, i.e., a control operation that is performed to prevent tie-up from occurring in the automatic transmission.

DETAILED DESCRIPTION OF THE PREFERRED EMBODIMENTS

Figure 1:
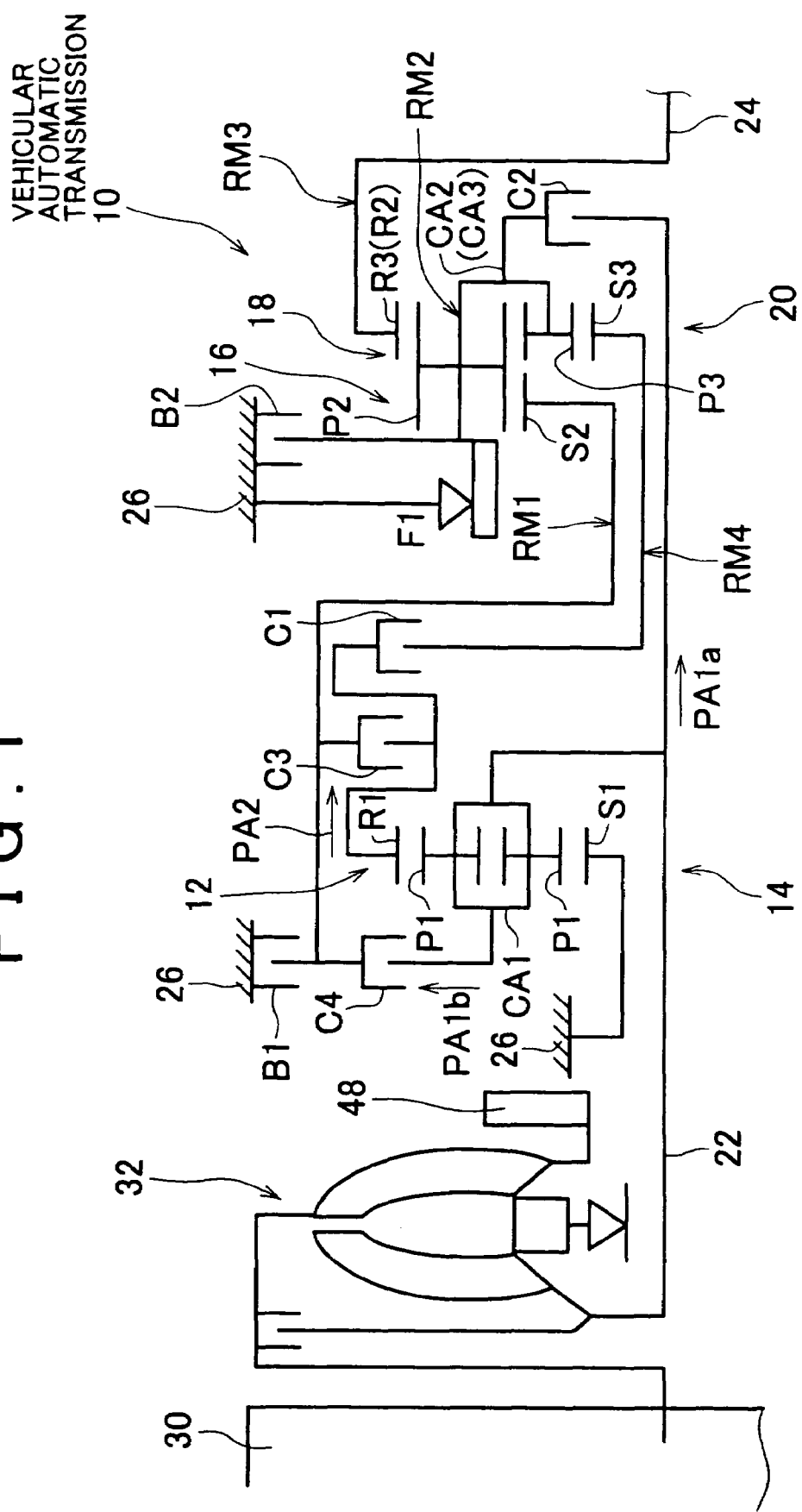
FIG. 1 is a skeleton view illustrating the structure of a vehicular automatic transmission to which the invention has been applied.

In the following description and the accompanying drawings, the present invention will be described in more detail with reference to exemplary embodiments. FIG. 1 is a skeleton view illustrating the structure of an automatic transmission 10 for a vehicle to which the invention has been applied. FIG. 2 is a clutch and brake engagement chart showing various engagement and release combinations of engagement devices (engagement elements) to achieve a plurality of speeds in the automatic transmission 10. The automatic transmission 10 includes a first transmitting portion 14 and a second transmitting portion 20 aligned on the same axis within a transmission case (hereinafter simply referred to as "case") 26 which is a non-rotating member that is attached to the vehicle body. The first transmitting portion 14 mainly includes a double pinion type first planetary gearset 12, while the second transmitting portion 20 mainly includes a single pinion type second planetary gearset 16 and a double pinion type third planetary gearset 18. The automatic transmission 10 uses these first and second transmitting portions 14 and 20 to appropriately change the rate and/or direction of rotation that is input from an input shaft 22 and outputs the changed rotation from an output shaft 24. The input shaft 22 corresponds to an input rotating member and is a turbine shaft of a torque converter 32 that is driven by an engine 30 which is the power source for driving the vehicle in this exemplary embodiment. The output shaft 24 corresponds to an output rotating member and drives left and right driven wheels via a differential gear unit (a final reducer) and a pair of drive axles and the like, in that order, not shown, for example. The automatic transmission 10 is structured generally symmetrical with respect to its axial center, so the portion that is below the axial center is omitted from the skeleton view in FIG. 1.

The first planetary gearset 12 includes a sun gear S1, a plurality of sets of pinion gears P1 which are in mesh with each other, a carrier CA1 which rotatably and revolvably supports the pinion gears P1, and a ring gear R1 which is in mesh with the sun gear S1 via the pinion gears P1. The sun gear S1, the carrier CA1, and the ring gear R1 are three rotating elements. The carrier CA1 is coupled to the input shaft 22 and thus rotatably driven thereby, while the sun gear S1 is integrally fixed to the case 26 and thus is unable to rotate. The ring gear R1 serves as an intermediate output member and rotates at a slower speed than the input shaft 22 does, outputting that rotation to the second transmitting portion 20. In this exemplary embodiment, a path by which rotation of the input shaft 22 is transmitted to the second transmitting portion 20 without the speed of that rotation being changed will be referred to as a first intermediate output path PA1. That is, this path is a path by which rotation is transmitted at a fixed speed ratio (=1.0) that is set in advance. This first intermediate output path PA1 includes two paths: a direct path PA1a by which rotation is transmitted from the input shaft 22 to the second transmitting portion 20 without passing through the first planetary gearset 12, and an indirect path PA1*b* by which rotation is transmitted from the input shaft 22 to the second transmitting portion 20 by passing through the carrier CA1 of the first planetary gearset 12. There is also a second intermediate output path PA2. This is a path by which rotation that has been transmitted from the input shaft 22 to the second transmitting portion 20 via the carrier CA1, the pinion gears P1 mounted on that carrier CA1, and the ring gear R1 is slowed (i.e., reduced) and transmitted at a larger speed ratio (>1.0) than that of the first intermediate output path PA1.

The second planetary gearset 16 includes a sun gear S2, a pinion gear P2, a carrier CA2 which rotatably and revolvably supports the pinion gear P2, and a ring gear R2 which is in mesh with the sun gear S2 via the pinion gear P2. Also, the third planetary gearset 18 includes a sun gear S3, a plurality of sets of pinion gears P2 and P3 which are in mesh with each other, a carrier CA3 which rotatably and revolvably supports the pinion gears P2 and P3, and a ring gear R3 which is in mesh with the sun gear S3 via the pinion gears P2 and P3.

Further, four rotating elements RM1 to RM4 are formed by portions of the second planetary gearset 16 and the third planetary gearset 18 which are connected together. More specifically, a sun gear S2 of the second planetary gearset 16 forms the first rotating element RM1. A carrier CA2 of the second planetary gearset 16 and a carrier CA3 of the third planetary gearset 18 are integrally connected together and form the second rotating element RM2. A ring gear R2 of the second planetary gearset 16 and a ring gear R3 of the third planetary gearset 18 are integrally connected together and form the third rotating element RM3, and a sun gear S3 of the third planetary gearset 18 forms the fourth rotating element RM4. The second planetary gearset 16 and the third planetary gearset 18 are structured such that the carrier CA2 and the carrier CA3 are common members, and the ring gear R2 and the ring gear R3 are common members. Also, the second planetary gearset 16 and the third planetary gearset 18 together form a Ravigneaux type planetary gear train in which the pinion gear P2 of the second planetary gearset 16 also serves as the second pinion gear of the third planetary gearset 18.

The first rotating element RM1 (sun gear S2) is selectively connected to the case 26 by a first brake B1 so as to be prevented from rotating, as well as selectively connected to the ring gear R1 (i.e., the second intermediate output path PA2) of the first planetary gearset 12, which is the intermediate output member, via the third clutch C3, and selectively connected to the carrier CA1 (i.e., the indirect path PA1*b* of the intermediate output path PA1) of the first planetary gearset 12 via the fourth clutch CA4. Similarly, the second rotating element RM2 (carriers CA2 and CA3) is selectively connected to the case 26 by a second brake B2 so as to be prevented from rotating, as well as selectively connected to the input shaft 22 (i.e., the direct path PA1*a* of the first intermediate output path PA1) via the second clutch 2. The third rotating element RM3 (ring gears R2 and R3) is integrally connected to the output shaft 24 and outputs rotation thereto. The fourth rotating element RM4 (sun gear S3) is connected to the ring gear R1 via the first clutch C1. A one-way clutch F1 is provided in parallel with the second brake B2 between the second rotating element RM2 and the case 26. The one-way clutch F1 allows forward rotation (i.e., rotation in the same direction as that in which the input shaft 22 rotates) while preventing reverse rotation of the second rotating element RM2.

Figure 3:
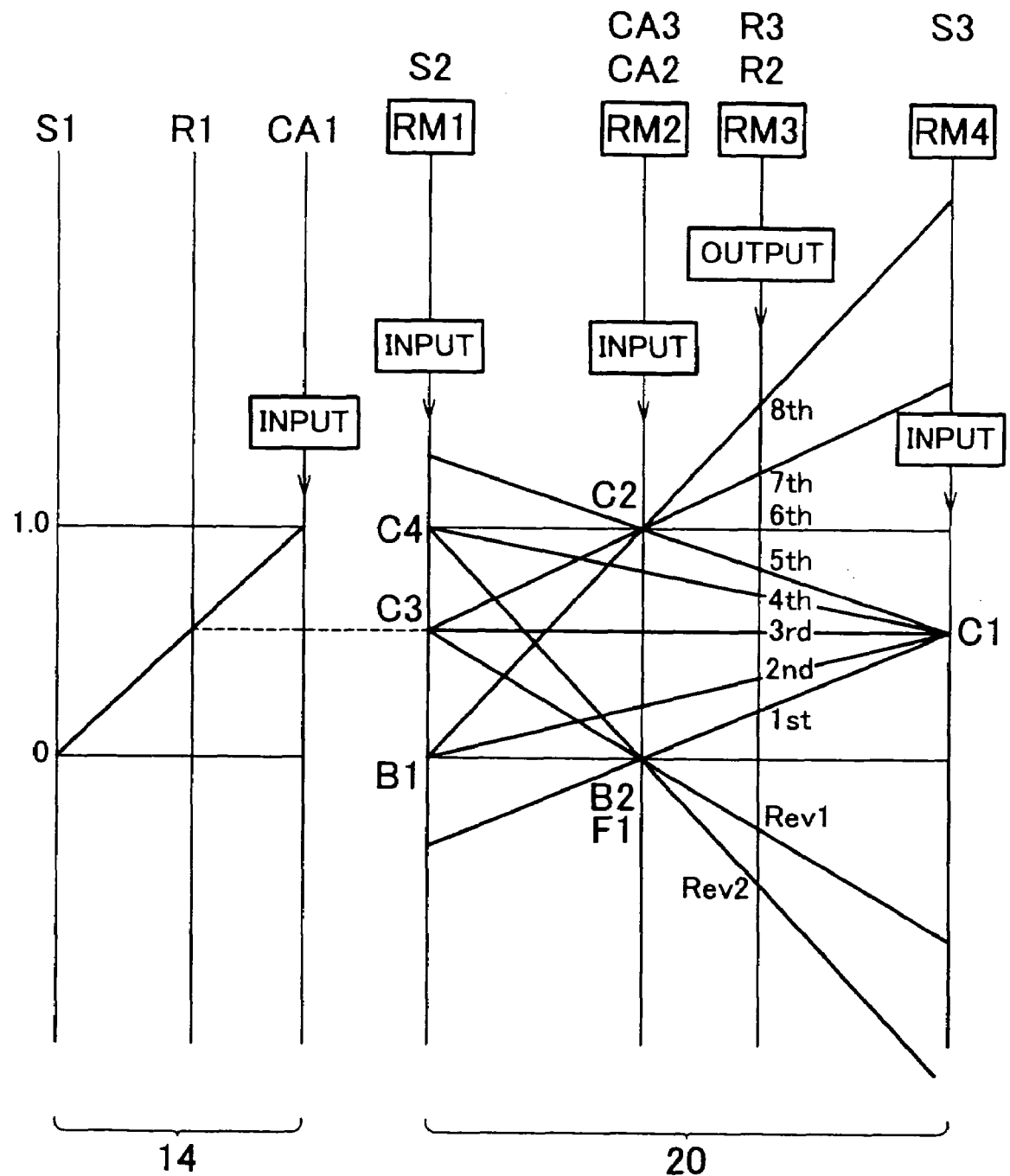
FIG. 3 is an alignment graph that can illustrate the rotation speeds of various rotating elements at each speed using straight lines in the vehicular automatic transmission shown in FIG. 1.

FIG. 3 is an alignment graph that can illustrate the rotation speeds of various rotating elements of the first transmitting portion 14 and the second transmitting portion 20 using straight lines. The lower horizontal line represents a rotation speed of "0" and the upper horizontal line represents a rotation speed of "1.0", i.e., a rotation speed the same as that of the input shaft 22. Also, the three vertical lines of the first transmitting portion 14 represent, in order from the left, the sun gear S1, the ring gear R1, and the carrier CA1. The intervals therebetween are determined according to a gear ratio ρ1 (=number of teeth on the sun gear S1/number of teeth on the ring gear R1) of the first planetary gearset 12. The four vertical lines of the second transmitting portion 20 represent, in order from left to right, the first rotating element RM1 (sun gear S2), the second rotating element RM2 (carrier CA2 and carrier CA3), the third rotating member RM3 (ring gear R2 and ring gear R3), and the fourth rotating element RM4 (sun gear S3). The intervals therebetween are determined according to a gear ratio ρ2 of the second planetary gearset 16 and a gear ratio ρ3 of the third planetary gearset 18.

As shown in FIG. 3, when the first clutch C1 and the second brake B2 are engaged such that the fourth rotating element RM4 rotates slower than the input shaft 22 via the first transmitting portion 14 and the second rotating element RM2 is held, the third rotating member RM3 which is connected to the output shaft 24 rotates at a speed indicated by "1st" such that first speed "1st" which has the largest speed ratio (=rotation speed of the input shaft 22/rotation speed of the output shaft 24) is established.

When the first clutch C1 and the first brake B1 are engaged such that the fourth rotating element RM4 rotates slower than the input shaft 22 via the first transmitting portion 14 and the first rotating element RM1 is held, the third rotating member RM3 rotates at a speed indicated by "2nd" such that second speed "2nd" which has a speed ratio smaller than that of first speed "1st" is established.

When the first clutch C1 and the third clutch C3 are engaged such that the fourth rotating element RM4 and the first rotating element RM1 rotate slower than the input shaft 22 via the first transmitting portion 14 and the second transmitting portion 20 rotates as a unit, the third rotating member RM3 rotates at a speed indicated by "3rd" such that third speed "3rd" which has a speed ratio smaller than that of second speed "2nd" is established.

When the first clutch C1 and the fourth clutch C4 are engaged such that the fourth rotating element RM4 rotates slower than the input shaft 22 via the first transmitting portion 14 and the first rotating element RM1 rotates together with the input shaft 22 as a unit, the third rotating member RM3 rotates at a speed indicated by "4th" such that fourth speed "4th" which has a speed ratio smaller than that of third speed "3rd" is established.

When the first clutch C1 and the second clutch C2 are engaged such that the fourth rotating element RM4 rotates slower than the input shaft 22 via the first transmitting portion 14 and the second rotating element RM2 rotates together with the input shaft 22 as a unit, the third rotating member RM3 rotates at a speed indicated by "5th" such that fifth speed "5th" which has a speed ratio smaller than that of fourth speed "4th" is established.

When the second clutch C2 and the fourth clutch C4 are engaged such that the second transmitting portion 20 rotates together with the input shaft 22 as a unit, the third rotating member RM3 rotates at a speed indicated by "6th", i.e., at the same rotation speed as the input shaft 22, such that sixth speed "6th" which has a speed ratio smaller than that of fifth speed "5th" is established. The speed ratio of sixth speed "6th" is 1.

When the second clutch C2 and the third clutch C3 are engaged such that the first rotating element RM1 rotates slower than the input shaft 22 via the first transmitting portion 14 and the second rotating element RM2 rotates together with the input shaft 22 as a unit, the third rotating member RM3 rotates at a speed indicated by "7th" such that seventh speed "7th" which has a speed ratio smaller than that of sixth speed "6th" is established.

When the second clutch C2 and the first brake B1 are engaged such that the second rotating element RM2 rotates together with the input shaft 22 as a unit and the first rotating element RM1 is held, the third rotating member RM3 rotates at a speed indicated by "8th" such that eighth speed "8th" which has a speed ratio smaller than that of seventh speed "7th" is established.

Also, when the third clutch C3 and the second brake B2 are engaged such that the first rotating element RM1 rotates slower than the input shaft 22 via the first transmitting portion 14 and the second rotating element RM2 is held, the third rotating member RM3 rotates in reverse at a speed indicated by "Rev1" such that a first reverse speed "Rev1" which has the largest speed ratio in the reverse direction is established. When the fourth clutch C4 and the second brake B2 are engaged such that the first rotating element RM1 rotates together with the input shaft 22 as a unit and the second rotating element RM2 is held, the third rotating member RM3 rotates in reverse at a speed indicated by "Rev2" such that a second reverse speed "Rev2" which has a speed ratio smaller than that of the first reverse speed "Rev1" is established. The first reverse speed "Rev1" corresponds to first speed but in the reverse direction and the second reverse speed "Rev2" corresponds to second speed but also in the reverse direction.

Returning now to FIG. 2, the clutch and brake engagement chart shows the operating states of the four clutches C1 to C4, the two brakes B1 to B2, and the one-way clutch F1 when each of the speeds described above are established. A circle indicates an engaged state while a circle enclosed by parentheses indicates an engaged state only during engine braking. An absence of either of those marks (i.e., a blank space) indicates a released state. The one-way clutch F1 is provided in parallel with the second brake B2 that establishes first speed "1st" so it is not always necessary to engage the second brake B2 when taking off (when accelerating). Also, the speed ratios of the speeds are set appropriately according to the gear ratio ρ1 of the first planetary gearset 12, the gear ratio ρ2 of the second planetary gearset 16, and the gear ratio ρ3 of the third planetary gearset 18.

Also, as shown in FIG. 2, all of the speeds described above can be shifted into simply by selecting and engaging any two from among the clutches C1 to C4 and the brakes B1 and B2. If another engagement device other than the two engagement devices that engage to establish a predetermined speed also engages at this time, that engagement is abnormal (hereinafter simply referred to as "abnormal engagement") and results in tie-up occurring in the automatic transmission 10.

Also, the clutches C1 to C4 and the brakes B1 and B2 (hereinafter simply referred to as clutches C and brakes B when there is no need to distinguish between the individual clutches C1 to C4 and brakes B1 and B2) are hydraulic type friction engagement devices such as multiple disc clutches and brakes, the engagement of which is controlled by a hydraulic actuator.

Figure 4:
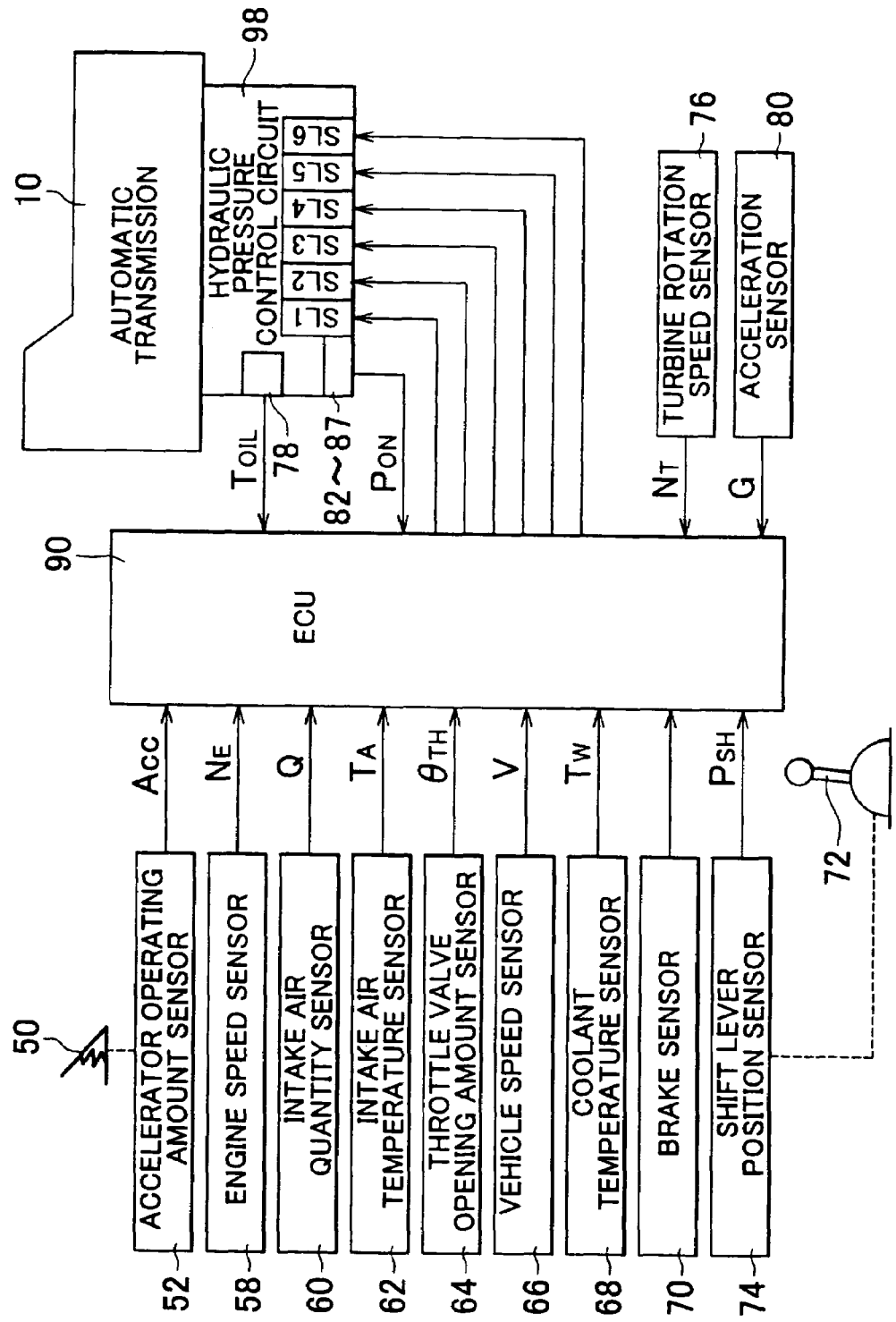
FIG. 4 is a block diagram showing the main portions of a control system provided in the vehicle for controlling the automatic transmission shown in FIG. 1.

FIG. 4 is a block diagram showing the main portions of a control system provided in the vehicle for controlling the automatic transmission 10 and the like shown in FIG. 1. An electronic control unit (hereinafter simply referred to as "ECU") 90 includes a so-called microcomputer that is provided with a CPU, RAM, ROM, an input/output interface, and the like. The CPU executes various controls such as output control of an engine 30 and shift control of the automatic transmission 10 by processing signals according to programs stored beforehand in the ROM while using the RAM to temporarily store data. When necessary, the CPU may be structured such that the portion for engine control is separate from the portion for shift control and the like.

In FIG. 4, an accelerator operating amount sensor 52 detects an operating amount Acc of an accelerator pedal 50 and sends a signal indicative of that accelerator operating amount Acc to the ECU 90. The accelerator pedal 50 corresponds to an accelerator operating member because it is depressed an amount corresponding to amount of demand by a driver for output. The accelerator operating amount Acc corresponds to that output demand amount.

Various sensors and switches and the like are also provided, some of which include an engine speed sensor 58 for detecting a speed $N_E$ of the engine 30, an intake air quantity sensor 60 for detecting an intake air quantity Q of the engine 30, an intake air temperature sensor 62 for detecting a temperature $T_A$ of the intake air, a throttle valve opening amount sensor 64 for detecting an opening amount $\theta_{TH}$ of an electronic throttle valve, a vehicle speed sensor for detecting a vehicle speed V (which corresponds to a rotation speed $N_{OUT}$ of the output shaft 24), a coolant temperature sensor 68 for detecting a coolant temperature TW of the engine 30, a brake sensor 70 for detecting operation of a foot brake, i.e., a service brake, a shift lever position sensor 74 for detecting a position (i.e., operating position) $P_{SH}$ of a shift lever 72, a turbine rotation speed sensor 76 for detecting a turbine rotation speed $N_T$ (=rotation speed NIN of the input shaft 22), an AT oil temperature sensor 78 for detecting an AT oil temperature $T_{OIL}$, i.e., the temperature of the hydraulic fluid in a hydraulic pressure control circuit 98, an acceleration sensor 80 for detecting acceleration (deceleration) G of the vehicle, and hydraulic pressure switches 82, 83, 84, 85, 86, and 87 which output a predetermined signal such as an ON signal $P_{ON}$ when the hydraulic pressure becomes equal to or greater than a predetermined pressure to generate torque to engage the clutches C1 to C4 and the brakes B1 and B2. These sensors and switches and the like send the ECU 90 various signals indicative of, for example, the engine speed $N_E$, the intake air quantity Q, the intake air temperature $T_A$, the throttle valve opening amount $\theta_{TH}$, the vehicle speed V, the output shaft rotation speed $N_{OUT}$, the engine coolant temperature TW, brake operation, the position $P_{SH}$ of the shift lever 72, the turbine rotation speed $N_T$, the AT oil temperature $T_{OIL}$, the acceleration (deceleration) G of the vehicle, the ON signal $P_{ON}$ of the engagement hydraulic pressure, and the like.

Figure 5:
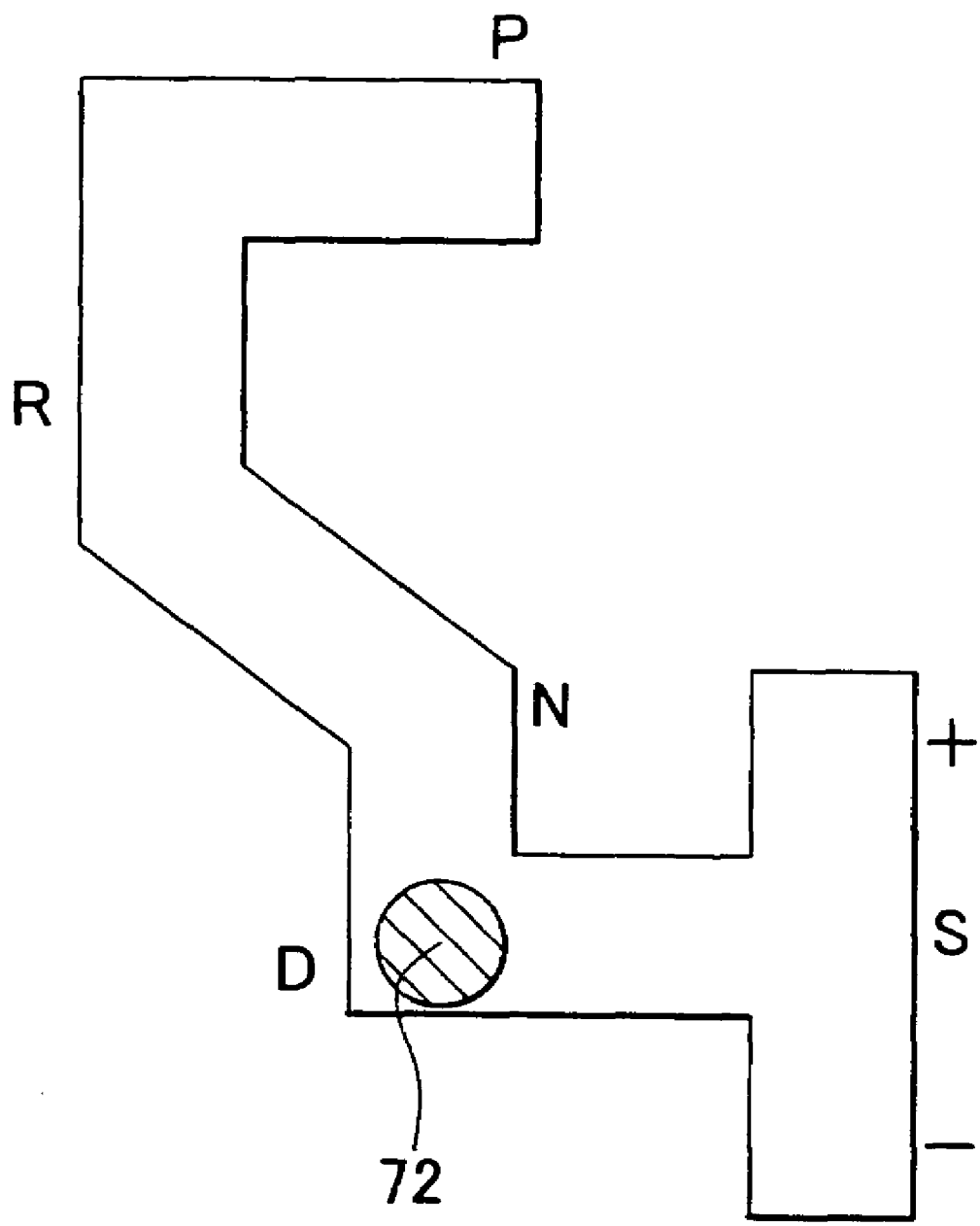
FIG. 5 is a view showing the operating position of a shift lever shown in FIG. 4.

The shift lever 72 is provided near the driver's seat, for example, and is operated manually into any one of five lever positions, "P", "R", "N", "D", and "S", as shown in FIG. 5. The "P" position is a parking position for disrupting the power transmission path within the automatic transmission 10 and mechanically preventing (i.e., locking) the output shaft 24 from rotating by a mechanical parking mechanism. The "R" position is a reverse driving position for rotating the output shaft 24 of the automatic transmission 10 in the reverse direction. The "N" position is a position for disrupting the power transmission path within the automatic transmission 10, i.e., for placing the automatic transmission 10 in neutral whereby the transmission of power in the automatic transmission 10 is interrupted. The "D" position is a forward driving position that executes automatic shift control in a shift range (D range) that allows shifting among eight speeds (i.e., first speed through eighth speed) of the automatic transmission 10. The "S" position is a forward driving position that allows shifting to be performed manually by shifting between different speeds or a plurality of speed ranges which have different high speeds into which the transmission can be shifted. This "S" position has both a "+" position for upshifting the automatic transmission 10 into a higher speed range or speed with each operation of the shift lever 72, and a "−" position for downshifting the automatic transmission 10 into a lower shift range or speed with each operation of the shift lever 72. The shift lever position sensor 74 detects which position (i.e., operating position) $P_{SH}$ the shift lever 72 is in.

Also, a manual valve which is connected to the shift lever 72 by a cable or link or the like is provided in the hydraulic pressure control circuit 98, for example. A hydraulic pressure circuit in the hydraulic pressure control circuit 98 is switched by a mechanical operation of that manual valve in response to an operation of the shift lever 72. For example, in the "D" position and the "S" position, a forward hydraulic pressure PD is output to mechanically establish a forward circuit which enables the vehicle to run forward while shifting through the forward speeds, i.e., first speed "1st" to eighth speed "8th". When the shift lever 72 is shifted into the "D" position, the ECU 90 determines that shift from a signal from the shift lever position sensor 74, establishes an automatic shift mode, and performs shift control using all of the forward speeds, i.e., first speed "1st" to eighth speed "8th".

Figure 6:
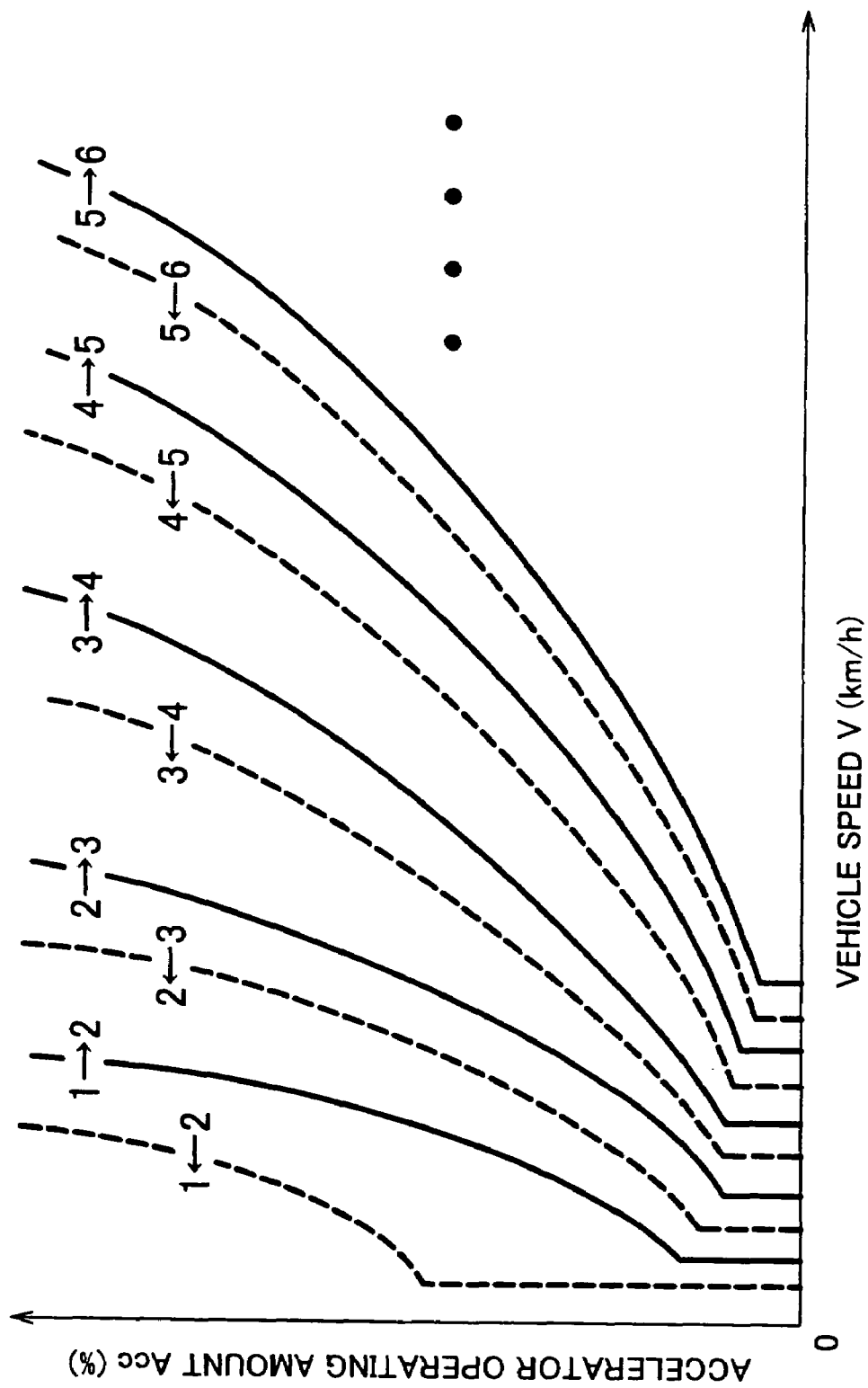
FIG. 6 is one example of a shift diagram used in shift control by an electronic control unit shown in FIG. 4.

The ECU 90 also functions as a shift controller 110 (see FIG. 8) that determines what shift to perform based on the actual vehicle speed V and the accelerator operating amount Acc from a relationship (map, shift diagram) stored beforehand which uses the vehicle speed V and the accelerator operating amount Acc as parameters, as shown in FIG. 6, for example, and then performs shift control to establish the determined speed. For example, a low speed with a large speed ratio is established when the vehicle speed V decreases or the accelerator operating amount Acc increases. In this shift control, the determined speed is established by energizing/de-energizing and performing current control of linear solenoid valves SL1 to SL6 in the hydraulic pressure control circuit 98 for shifting such that the clutches C and brakes B switch from being engaged (released) to released (engaged), and controlling the transient hydraulic pressure in the shift process, and like. That is, any one of the first speed "1st" to the eighth speed "8th" can be established by appropriately engaging and releasing the clutches C and brakes B, which is done by energizing and de-energizing the linear solenoid valves SL1 to SL6 appropriately.

In the shift diagram in FIG. 6, the solid line is a shift line (an upshift line) for when an upshift is determined and the broken line is a shift line (a downshift line) for when a downshift is determined. Also, the shift lines in the shift diagram in FIG. 6 are provided to determine whether the actual vehicle speed V on a horizontal line showing the actual accelerator operating amount Acc (%) has crossed a shift line, i.e., whether the actual vehicle speed V exceeds a value (shift point vehicle speed) VS at which a shift on the shift line should be executed, and are stored in advance as a series of these values VS, i.e., shift point speeds. The shift diagram in FIG. 6 illustrates shift lines for only the first to the sixth speeds of the first to the eighth speeds for which shifting is executed by the automatic transmission 10.

Figure 7:
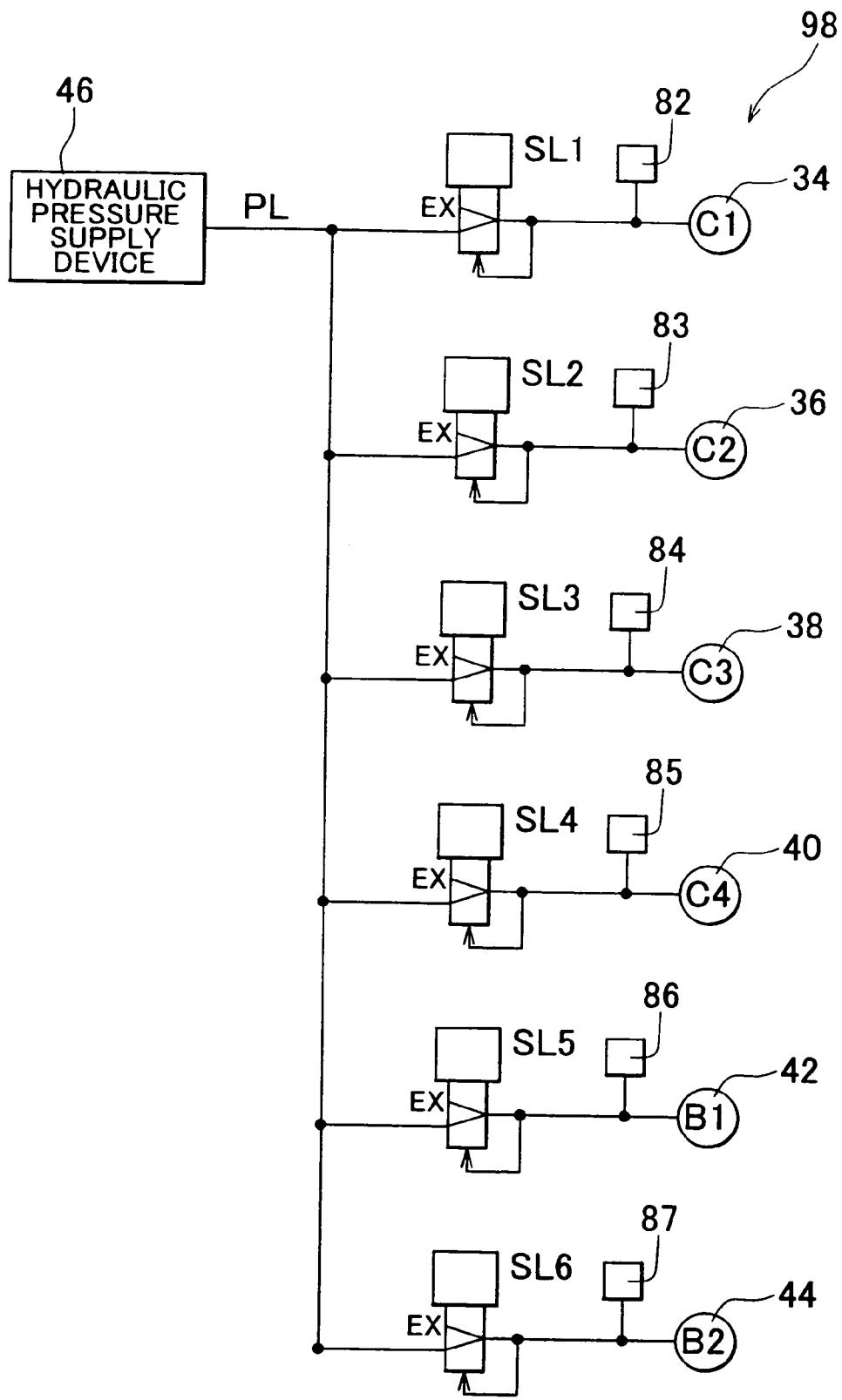
FIG. 7 is a circuit diagram showing the main portions of a hydraulic pressure control circuit shown in FIG. 4.

FIG. 7 is a circuit diagram showing the portions of the hydraulic pressure control circuit 98 that relate to the linear solenoid valves SL1 to SL6. Line hydraulic pressure PL output from a hydraulic pressure supply device 46 is regulated by the linear solenoid valves SL1 to SL6 and supplied directly to the hydraulic actuators (hydraulic cylinders) 34, 36, 38, 40, 42, and 44 of the clutches C1 to C4 and the brakes B1 and B2. Further, the hydraulic pressure switches 82, 83, 84, 85, 86, and 87 which output an ON signal $P_{ON}$ to the ECU 90 (see FIG. 4) if the hydraulic pressure supplied from the linear solenoid valves SL1 to SL6 to the hydraulic actuators 34, 36, 38, 40, 42, and 44 becomes equal to or greater than the predetermined pressure, are provided on the output side of the linear solenoid valves SL1 to SL6.

The hydraulic pressure supply device 46 includes a mechanical oil pump 48 (see FIG. 1) that is driven by the engine 30 and a regulator valve that regulates the line hydraulic pressure PL, and the like. The hydraulic pressure supply device 46 controls the line hydraulic pressure PL according to engine load and the like. The linear solenoid valves SL1 to SL6 all basically have the same structure and are energized and de-energized independently by the ECU 90 (see FIG. 4) such that the hydraulic pressure of the hydraulic actuators 34 to 44 is controlled (regulated) independently. In the shift control of the automatic transmission 10, a so-called clutch-to-clutch shift is executed in which, for example, a clutch C or brake B involved in the shift is released while at the same time another clutch C or brake B involved in the shift is engaged. For example, in a 5th →4th downshift as shown in the clutch and brake engagement chart in FIG. 2, the second clutch C2 is released and the fourth clutch C4 is engaged while release transient hydraulic pressure of the second clutch C2 and engage transient hydraulic pressure of the fourth clutch C4 are appropriately controlled to suppress shift shock. Directly controlling the engagement devices (i.e., the clutches C and the brakes B) of the automatic transmission 10 by the linear solenoid valves SL1 to SL6 in this way improves operational responsiveness of the engagement devices. The hydraulic pressure circuit for operating (i.e., engaging and releasing) those engagement devices is also simplified.

In this way, each speed is established in the automatic transmission 10 by engaging an engagement device determined in advance as shown in the clutch and brake engagement chart in FIG. 2, for example. It is possible however, that tie-up may occur in the automatic transmission 10 if an engagement device other than the predetermined engagement device used to establish the speed engages abnormally at the same time as the predetermined engagement device engages. The abnormal engagement of an engagement device might be the result of an ON failure in which failure of a solenoid valve or failure of the control system of a solenoid valve, for example, causes hydraulic fluid to be supplied from the linear solenoid valve to an engagement device that is not involved in establishing the shift, thereby causing that engagement device to engage abnormally. Therefore, this exemplary embodiment appropriately prevents tie-up in the automatic transmission 10 from occurring due to abnormal engagement of an engagement device. The control operation for this will hereinafter be described in detail.

Figure 8:
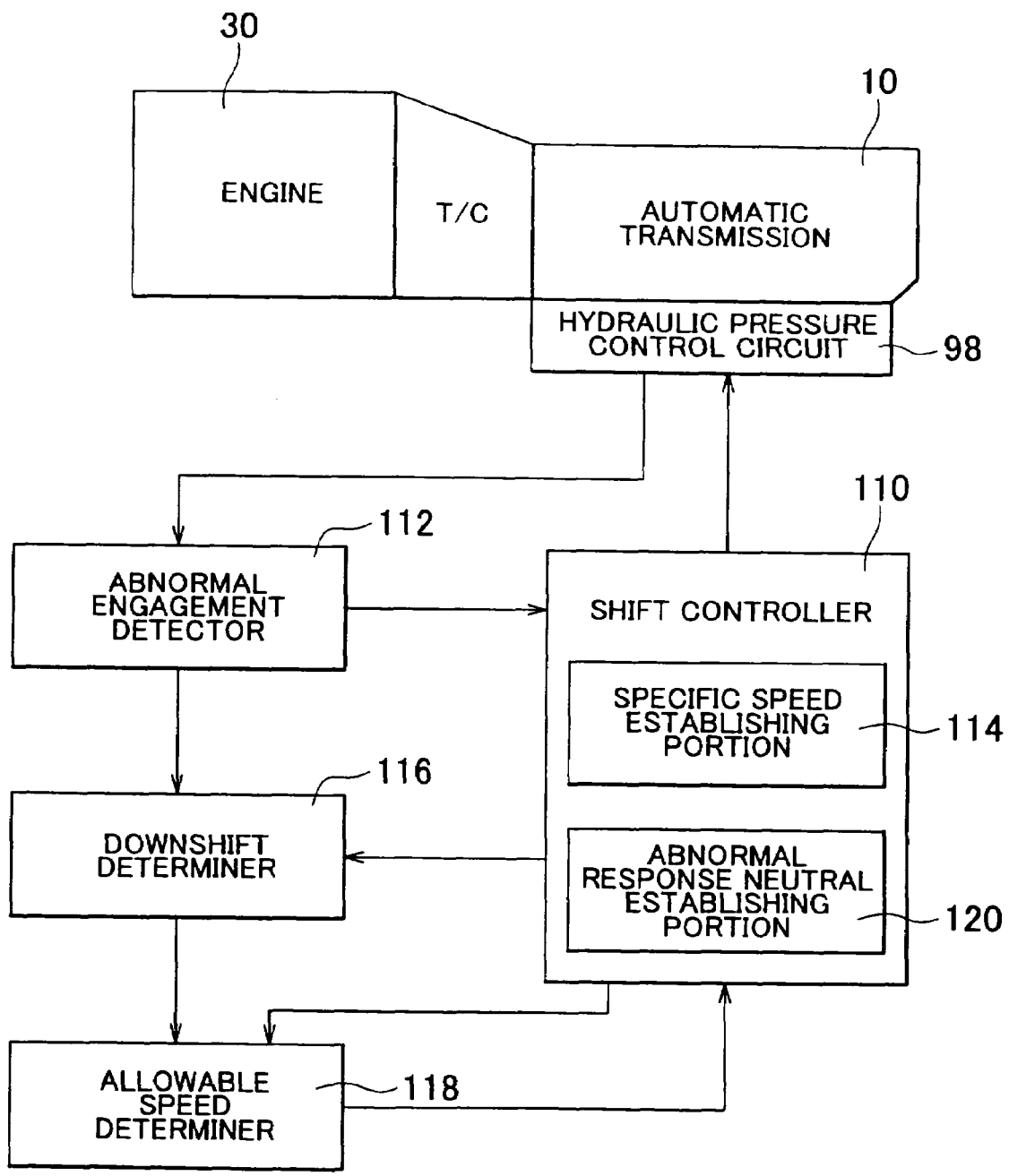
FIG. 8 is a functional block line diagram showing the main portions of control functions of the electronic control unit shown in FIG. 4.

FIG. 8 is a functional block line diagram showing the main portions of control functions of the ECU 90, i.e., showing the control operation to prevent tie-up from occurring in the automatic transmission 10. In the drawing, the shift controller 110 makes a shift determination based on the actual vehicle speed V and the accelerator operating amount Acc from the shift diagram stored beforehand shown in FIG. 6, and automatically switches the gear speed of the automatic transmission 10 by outputting a shift signal to the hydraulic pressure control circuit 98 to execute the determined shift. For example, when it is determined that the actual vehicle speed V has crossed the 7th→8th upshift line where a 7th→8th upshift should be executed, i.e., when it is determined that the actual vehicle speed V exceeds the shift point vehicle speed V7-8, the shift controller 110 outputs a command to the hydraulic pressure control circuit 98 to release the third clutch C3 and engage the first brake B1, i.e., outputs a command to de-energize the linear solenoid valve SL3 in order to drain the engaging hydraulic pressure from the third clutch C3, and outputs a command to energize the linear solenoid valve SL5 in order to supply engaging hydraulic pressure to the first brake B1.

An abnormal engagement detector 112 detects an ON failure, i.e., abnormal engagement of an engagement device that causes tie-up to occur in the automatic transmission 10. For example, as described above, a hydraulic pressure switch 82, 83, 84, 85, 86, or 87 outputs an ON signal $P_{ON}$ when hydraulic fluid is supplied from a linear solenoid valve corresponding to that hydraulic pressure switch 82, 83, 84, 85, 86, or 87, to an engagement device in order to engage that engagement device. An ON failure is detected then when, for example, an ON signal $P_{ON}$ is output from a hydraulic pressure switch 82, 83, 84, 85, 86, or 87 provided on the output side of an engagement device that is not involved in establishing the speed in the automatic transmission 10, despite the fact that a command to de-energize is being output to the linear solenoid valve that is supplying the hydraulic fluid to that engagement device. Therefore, an ON failure can be detected depending on whether an ON signal $P_{ON}$ is output from the hydraulic pressure switch 82, 83, 84, 85, 86, or 87 provided on the output side of the linear solenoid valve to which the de-energizing command is being output.

For example, if the vehicle is running with the automatic transmission 10 in eighth speed "8th", in which the second clutch C2 and the first brake B1 are engaged, and hydraulic fluid which engages an engagement device that is not involved in establishing eighth speed "8th" (i.e., an engagement device other than the second clutch C2 and the first brake B1, such as the first clutch C1, for example) is supplied from the linear solenoid valve SL1, the abnormal engagement detector 112 detects that an ON failure in the first clutch C1 has occurred by the ON signal $P_{ON}$ that is output from the hydraulic pressure switch 82 provided on the output side of the linear solenoid valve SL1.

The abnormal engagement detector 112 also functions as a tie-up cause detector that detects the cause of tie-up in the automatic transmission 10 by detecting an ON failure in an engagement device based on an ON signal $P_{ON}$ from the hydraulic pressure switches 82, 83, 84, 85, 86, and 87.

The shift controller 110 includes a specific speed establishing portion 114 that establishes a predetermined specific speed set in advance in order to prevent tie-up from occurring in the automatic transmission 10, when the abnormal engagement detector 112 has detected an ON failure in an engagement device. For example, when an ON failure in an engagement device is detected by the abnormal engagement detector 112, the specific speed establishing portion 114 establishes a failsafe gear speed, that is, a predetermined specific speed that includes, as a necessary condition in order for it to be established, the abnormal engagement of an engagement device that causes tie-up in the automatic transmission 10, i.e., engagement of the engagement device in which the ON failure was detected. That is, the specific speed establishing portion 114 establishes, as a predetermined specific speed, a speed that is established by engagement of at least the engagement device in which the ON failure was detected. For example, the specific speed establishing portion 114 outputs a command to the hydraulic pressure control circuit 98 to establish the highest speed from among the speeds that are established using the engagement device in which the ON failure was detected.

For example, if the vehicle is running with the automatic transmission 10 in eighth speed "8th", in which the second clutch C2 and the first brake B1 are engaged, and an ON failure is detected in the first clutch C1 by the abnormal engagement detector 112, the specific speed establishing portion 114 outputs a command to the hydraulic pressure control circuit 98 to keep the second clutch C2 engaged and release the first brake B1 in order to establish, as the failsafe speed, a speed in which at least the first clutch C1 is engaged, such as fifth speed "5th", for example, which is the highest speed from among the speeds in which at least the first clutch C1 is engaged.

Also, as another example, if the vehicle is running in seventh speed "7th" and an ON failure is detected in the first clutch C1, the specific speed establishing portion 114 releases the third clutch C3, thus establishing fifth speed "5th" as the failsafe gear speed. Similarly, if the vehicle is running in sixth speed "6th" and an ON failure is detected in the first clutch C1, the specific speed establishing portion 114 releases the fourth clutch C4, thus establishing fifth speed "5th" as the failsafe gear speed. Further, if the vehicle is running in eighth speed "8th" and an ON failure is detected in the fourth clutch C4, the specific speed establishing portion 114 releases the first brake B1, thus establishing sixth speed "6th" as the failsafe gear speed. In this way, logic is incorporated into the failsafe gear speed in advance.

When the automatic transmission 10 shifts to prevent tie-up from occurring, that shift may be a downshift as it is in the case where fifth speed "5th" is established as the failsafe gear speed when the vehicle is running with the automatic transmission 10 in eight speed "8th" and an ON failure is detected in the first clutch C1. In this case, there is a possibility that the engine speed $N_E$ may exceed the predetermined allowable speed depending on the vehicle V when that downshift is performed. That is, when a power transmission path from the engine 30 to the driven wheels is established so that power can be transmitted, there is a possibility that the engine speed $N_E$ may exceed the predetermined allowable speed depending on the vehicle speed V and the speed ratio γ of the automatic transmission 10, even if fuel has stopped being supplied to the engine 30, because the engine speed $N_E$ is restricted by the vehicle speed V, i.e., because the engine speed $N_E$ is uniquely determined by the vehicle speed V and the speed ratio γ of the automatic transmission 10. Also, this predetermined allowable speed is a predetermined allowable engine speed $N_E'$ that is experimentally set in advance which can be routinely used in an engine speed range that does not exceed the maximum speed allowed for the engine 30 in view of engine 30 durability and the like.

Therefore, in this exemplary embodiment, in addition to establishing the failsafe gear speed to prevent tie-up from occurring in the automatic transmission 10, when the shift into that failsafe gear speed is a downshift and there is a possibility that the engine speed $N_E$ may exceed the predetermined allowable engine speed $N_E'$, the shift into the failsafe gear speed is not executed. Instead, the automatic transmission 10 is placed in a neutral state in which no power is transmitted.

More specifically, a downshift determiner 116 determines whether establishment of the failsafe gear speed by the specific speed establishing portion 114, i.e., whether the shift into the failsafe gear speed, is a downshift in the automatic transmission 10. That is, the downshift determiner 116 determines whether the automatic transmission 10 is to downshift depending on the establishment of the failsafe gear speed in order to prevent tie-up in the automatic transmission 10 arising from an ON failure in an engagement device, i.e., depending on a so-called failsafe for preventing tie-up in the automatic transmission 10 arising from an ON failure in an engagement device. For example, when an ON failure in an engagement device is detected by the abnormal engagement detector 112, the downshift determiner 116 determines whether switching from the speed that the automatic transmission 10 was in when the ON failure was detected to the failsafe gear speed to be established by the specific speed establishing portion 114 is a shift into a lower speed, i.e., a downshift.

An allowable speed determiner 118 determines whether the engine speed $N_E$ will exceed the predetermined allowable engine speed $N_E'$ if the failsafe gear speed is established by the specific speed establishing portion 114. That is, the allowable speed determiner 118 determines whether there is a possibility that the engine speed $N_E$ will exceed the predetermined allowable engine speed $N_E'$ after a downshift is made into the failsafe gear speed when there is an ON failure in an engagement device. More specifically, when the abnormal engagement detector 112 detects an ON failure in an engagement device and the downshift determiner 116 determines that the automatic transmission 10 will downshift according to the failsafe, the allowable speed determiner 118 calculates an engine speed $N_{EF}$ at the time the specific speed establishing portion 114 establishes the failsafe gear speed, and determines whether that engine speed $N_{EF}$ exceeds the predetermined allowable engine speed $N_E'$. The allowable speed determiner 118 calculates this engine speed $N_{EF}(=N_{OUT} \times \gamma_F)$ based on the actual output shaft rotation speed $N_{OUT}$ of the automatic transmission 10 and a predetermined speed ratio $\gamma_F$ of the automatic transmission 10 in the failsafe gear speed. At this time the engine speed $N_{EF}$ is calculated even more accurately by considering the slip amount of the torque converter 32.

If the engine speed $N_E$ exceeds the predetermined allowable engine speed $N_E'$ due to the specific speed establishing portion 114 establishing the failsafe gear speed, abnormal response neutral establishing portion 120 places the automatic transmission 10 in a neutral state in which no power is transmitted. The neutral state in this case may be any state as long as the transmission of power in the automatic transmission 10 is interrupted even if an engagement device is engaged. It is not necessary that the automatic transmission 10 be placed completely in neutral, in which the transmission of power within the automatic transmission 10 is interrupted by releasing all of the engagement devices (the clutches C and the brakes B), as shown by "N" (corresponding to the shift lever position "N") in the clutch and brake engagement chart in FIG. 2.

For example, when the allowable speed determiner 118 determines that the engine speed $N_E$ will exceed the predetermined allowable engine speed $N_E'$ if the specific speed establishing portion 114 establishes the failsafe gear speed, then the abnormal response neutral establishing portion 120 places the automatic transmission 10 in a neutral state by releasing an engagement device other than the engagement device that will abnormally engage and cause tie-up in the automatic transmission 10, i.e., by releasing an engagement device other than the engagement device in which the ON failure has been detected. For example, the abnormal response neutral establishing portion 120 releases the engagement device to be released when establishing the failsafe gear speed, but does not engage an engagement device that should be engaged other than engagement device in which the ON failure was detected when establishing the failsafe gear speed.

For example, if an ON failure is detected in the first clutch C1 by the abnormal engagement detector 112 while the vehicle is running with the automatic transmission 10 in eighth speed "8th", in which the second clutch C2 and the first brake B1 are engaged, and the allowable speed determiner 118 has determined that the engine speed $N_E$ will exceed the predetermined allowable engine speed $N_E'$ if a downshift is performed to establish fifth speed "5th" as the failsafe gear speed, then the abnormal response neutral establishing portion 120 outputs a command to the hydraulic pressure control circuit 98 to release the first brake B1 as well as the second clutch C2. As a result, the first clutch C1 is the only engagement element that is engaged which would result in first speed "1st" being established, but the one-way clutch F1 rotates freely, overruns, thus enabling the automatic transmission 10 to be placed in a neutral state, thereby avoiding a state in which the engine speed $N_E$ exceeds the predetermined allowable engine speed $N_E'$ (i.e., avoiding overrun or over reving of the engine 30).

Also, the specific speed establishing portion 114 establishes the failsafe gear speed when the specific speed establishing portion 114 determines that the engine speed $N_E$ would not exceed the predetermined allowable speed $N_E'$ if the failsafe gear speed were established when the vehicle speed V decreases.

FIG. 9 is a flowchart illustrating the main portion of a control operation of the ECU 90, i.e., a control operation that is performed to avoid tie-up in the automatic transmission 10. This control is executed repeatedly in predetermined cycles.

In the drawing, a process to detect an ON failure that will cause tie-up to occur in the automatic transmission 10 is first performed in step S1 which corresponds to the abnormal engagement detector 112. For example, as described above, a hydraulic pressure switch 82, 83, 84, 85, 86, or 87 outputs an ON signal $P_{ON}$ when hydraulic fluid is supplied from a linear solenoid valve corresponding to that hydraulic pressure switch 82, 83, 84, 85, 86, or 87, to an engagement device in order to engage that engagement device. An ON failure is detected then when, for example, an ON signal $P_{ON}$ is output from a hydraulic pressure switch 82, 83, 84, 85, 86, or 87 provided on the output side of an engagement device that is not involved in establishing the speed in the automatic transmission 10, despite the fact that a command to de-energize is being output to the linear solenoid valve that is supplying the hydraulic fluid to that engagement device. Therefore, an ON failure can be detected depending on whether an ON signal $P_{ON}$ is output from the hydraulic pressure switch 82, 83, 84, 85, 86, or 87 provided on the output side of the linear solenoid valve to which the de-energizing command is being output.

If no ON signal $P_{ON}$ is detected such that the determination in step S1 is NO, the routine ends. If, on the other hand, an ON failure is detected such that the determination in step S1 is YES, then it is next determined in step S2 which corresponds to the downshift determiner 116 whether the establishment of the failsafe gear speed, i.e., whether the shift into the failsafe gear speed, is a downshift in the automatic transmission 10.

If the determination in step S2 is NO, the routine ends. If, on the other hand, the determination is YES, then it is next determined in step S3 which corresponds to the allowable speed determiner 118 whether the engine speed $N_E$ will exceed the allowable engine speed $N_E'$ if the failsafe gear speed is established. That is, it is determined whether there is a possibility that the engine speed $N_E$ will exceed the predetermined allowable engine speed $N_E'$ after a downshift is performed to the failsafe gear speed when there is an ON failure in an engagement device.

If the determination in step S3 is YES, then the automatic transmission 10 is placed in a neutral state in which no power is transmitted in step S4 which corresponds to the abnormal response neutral establishing portion 120. The automatic transmission 10 is placed in the neutral state, for example, by releasing an engagement device other than the engagement device that will abnormally engage and cause tie-up to occur in the automatic transmission 10, i.e., by releasing an engagement device other than the engagement device in which the ON failure has been detected (i.e., other than the failed engagement element).

If the determination in step S3 is NO, then the failsafe gear speed that includes, as a necessary condition in order for it to be established, the engagement of the engagement device in which the ON failure was detected is established in step S5 which corresponds to the specific speed establishing portion 114. For example, a command to establish the highest speed, from among the speeds that are established using the engagement device in which the ON failure was detected, is output to the hydraulic pressure control circuit 98. Also, the failsafe gear speed will similarly be established when there is no longer a possibility that the engine speed $N_E$ would exceed the predetermined allowable speed $N_E'$ if the failsafe gear speed were established when the vehicle speed V decreases.

As described above, according to this exemplary embodiment, when the abnormal engagement detector 112 detects an ON failure in an engagement device that will cause tie-up to occur in the automatic transmission 10 and there is a possibility that the engine speed $N_E$ will exceed the predetermined allowable engine speed $N_E'$ if the specific speed establishing portion 114 establishes the failsafe gear speed in order to prevent tie-up from occurring, then the abnormal response neutral establishing portion 120 places the automatic transmission 10 in a neutral state in which power is not transmitted. As a result, tie-up in the automatic transmission 10 that arises from an ON failure in an engagement device can be prevented. In addition, when the shift into the failsafe gear speed is a downshift, a case in which the engine speed $N_E$ exceeds the predetermined allowable engine speed $N_E'$, i.e., overrun that accompanies the downshift into the failsafe gear speed, can be avoided.

For example, the specific speed establishing portion 114 establishes a failsafe gear speed that includes, as a necessary condition in order for it to be established, the engagement of the engagement device in which the ON failure was detected so tie-up in the automatic transmission 10 that arises from an ON failure of an engagement device can be prevented. Also, the abnormal response neutral establishing portion 120 places the automatic transmission 10 in a neutral state by releasing an engagement device other than the engagement device in which the ON failure was detected. As a result, a case in which the engine speed $N_E$ exceeds the predetermined allowable engine speed $N_E'$ when the shift into the failsafe gear speed is a downshift can be avoided.

While an exemplary embodiment of the invention has herein been described in detail with reference to the drawings, the invention may also be applied in other forms.

For example, in the foregoing exemplary embodiment, the specific speed establishing portion 114 establishes a failsafe gear speed that includes, as a necessary condition in order for it to be established, the engagement of the engagement device in which the ON failure was detected. The specific speed establishing portion 114 does not always have to establish a failsafe gear speed that includes, as a necessary condition in order for it to be established, the engagement of the engagement device in which the ON failure was detected, however. For example, a failsafe valve may be provided in which the switching of fluid paths is set in advance so as to prevent tie-up from occurring in the automatic transmission 10 when an ON failure is detected, such that a failsafe gear speed may be established that does not have to include the engagement of the engagement device in which the ON failure was detected. The invention can also apply to this kind of case.

Further, in the foregoing exemplary embodiment, the hydraulic pressure switches 82, 83, 84, 85, 86, and 87 are provided on the output sides of the linear solenoid valves SL1 to SL6, respectively. These hydraulic pressure switches 82, 83, 84, 85, 86, and 87 do not necessarily need to be provided on the output side of all of the linear solenoid valves SL1 to SL6, however. For example, only one hydraulic pressure switch may be provided for the linear solenoid valves SL3 to SL6. In this case, the hydraulic pressure switch outputs an ON signal $P_{ON}$ when hydraulic pressure equal to or greater than a predetermined pressure is output from at least two of those four linear solenoid valves.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus of an automatic transmission that establishes a plurality of speeds of different speed ratios by selectively engaging and/or releasing a plurality of engagement devices, comprising:

an abnormal engagement detector that detects abnormal engagement of at least one of the engagement devices which causes tie-up to occur in the automatic transmission; and a controller that establishes a predetermined specific speed set in advance in order to prevent tie-up from occurring in the automatic transmission, when abnormal engagement of the at least one of the engagement devices is detected by the abnormal engagement detector, and places the automatic transmission in a neutral state when an engine speed will exceed a predetermined allowable speed if the predetermined specific speed is established.

2. The control apparatus of an automatic transmission according to claim 1, wherein the controller establishes the predetermined specific speed that in which, as a necessary condition in order for that predetermined specific speed to be established, the at least one of the engagement devices which cause tie-up to occur in the automatic transmission is engaged, and places the automatic transmission in the neutral state by releasing an engagement device other than the at least one of the engagement devices that engages abnormally.

3. The control apparatus of an automatic transmission according to claim 2, wherein the controller establishes, as the predetermined specific speed, the highest speed from among speeds in which, in order for those speeds to be established, the at least one of the engagement devices which cause tie-up to occur in the automatic transmission, when abnormal engagement of the at least one of the engagement devices is detected.

4. The control apparatus of an automatic transmission according to claim 1, wherein the controller places the automatic transmission in the neutral state when the engine speed will exceed the predetermined allowable speed if a downshift is performed into the predetermined specific speed.

5. The control apparatus of an automatic transmission according to claim 1, wherein the automatic transmission is structured such that each of the engagement devices is directly controlled by a corresponding solenoid valve that is connected thereto.

6. A control method of an automatic transmission that establishes a plurality of speeds of different speed ratios by selectively engaging and/or releasing a plurality of engagement devices, comprising the steps of:
  detecting abnormal engagement of at least one of the engagement devices which causes tie-up to occur in the automatic transmission;
  establishing a predetermined specific speed set in advance in order to prevent tie-up from occurring in the automatic transmission, when abnormal engagement of the at least one of the engagement devices is detected; and
  placing the automatic transmission in a neutral state when an engine speed will exceed a predetermined allowable speed if the predetermined specific speed is established.

7. The control method of an automatic transmission according to claim 6, further comprising the steps of:
  establishing the predetermined specific speed in which, as a necessary condition in order for that predetermined specific speed to be established, the at least one of the engagement devices which cause tie-up to occur in the automatic transmission is engaged; and
  placing the automatic transmission in the neutral state by releasing an engagement device other than the at least one of the engagement devices that engages abnormally.

8. The control method of an automatic transmission according to claim 7, further comprising the step of:
  establishing, as the predetermined specific speed, the highest speed from among speeds in which, in order for those speeds to be established, the abnormal engagement of the at least one of the engagement devices which cause tie-up to occur in the automatic transmission is encgaged, when abnormal engagement of the at least one of the engagement devices is detected.

9. The control method of an automatic transmission according to claim 6, further comprising the step of:
  placing the automatic transmission in the neutral state when the engine speed will exceed the predetermined allowable speed if a downshift is performed into the predetermined specific speed.

\* \* \* \* \*